US009429648B2

(12) United States Patent
Sugiyama

(10) Patent No.: US 9,429,648 B2
(45) Date of Patent: Aug. 30, 2016

(54) RADAR APPARATUS AND COMPUTER-READABLE STORAGE MEDIUM

(71) Applicant: FUJITSU LIMITED, Kawasaki-shi, Kanagawa (JP)

(72) Inventor: Yuuichi Sugiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 14/180,905

(22) Filed: Feb. 14, 2014

(65) Prior Publication Data

US 2014/0320333 A1    Oct. 30, 2014

(30) Foreign Application Priority Data

Mar. 29, 2013 (JP) .................................. 2013-075033

(51) Int. Cl.
| G01S 13/72 | (2006.01) |
| G01S 13/02 | (2006.01) |
| G01S 13/58 | (2006.01) |
| G01S 13/92 | (2006.01) |
| G01S 13/34 | (2006.01) |

(52) U.S. Cl.
CPC ............... G01S 13/02 (2013.01); G01S 13/58 (2013.01); G01S 13/92 (2013.01); G01S 13/34 (2013.01)

(58) Field of Classification Search
CPC ........ G01S 13/02; G01S 13/58; G01S 13/92; G01S 13/34; G01S 13/42; G01S 13/72; G01S 13/582
USPC ................... 342/81, 84–85, 95–97
See application file for complete search history.

(56) References Cited

U.S. PATENT DOCUMENTS

| 3,879,729 A * | 4/1975 | Nevin ................... G01S 13/534 342/161 |
| 4,649,390 A * | 3/1987 | Andrews ............... G01S 13/426 342/140 |
| 5,784,023 A * | 7/1998 | Bluege ................. G01S 7/4815 342/104 |
| 6,281,786 B1 * | 8/2001 | Adachi ................. G01S 13/931 340/435 |
| 8,314,732 B2 * | 11/2012 | Oswald .......................... 342/114 |
| 2005/0134440 A1 * | 6/2005 | Breed .................. B60N 2/2863 340/435 |
| 2005/0140541 A1 | 6/2005 | Yamagami et al. |

(Continued)

FOREIGN PATENT DOCUMENTS

| EP | 2784536 A1 * | 10/2014 | ............. G01S 13/02 |
| GB | 1408494 A * | 10/1975 | ............. G01S 13/72 |

(Continued)

OTHER PUBLICATIONS

European Patent Office, Extended European Search Report dated Apr. 29, 2014 issued with respect to counterpart European Application No. 14154822.2.

(Continued)

*Primary Examiner* — John B Sotomayor
(74) *Attorney, Agent, or Firm* — Fujitsu Patent Center

(57) ABSTRACT

A radar apparatus includes a detection unit to detect objects within a scan range based on a reflected wave received with respect to a transmission wave and to output detection results of the objects, and an adjusting unit to narrow the scan range so as not to detect an object other than a target object, when the detection results include the object other than the target object detected in the scan range within a predetermined time. The adjusting unit judges an object having a velocity less than a first value as the object other than the target object.

20 Claims, 14 Drawing Sheets

(56) References Cited

U.S. PATENT DOCUMENTS

| | | | |
|---|---|---|---|
| 2006/0176160 A1* | 8/2006 | Zoratti | G01S 13/18 340/435 |
| 2006/0238411 A1* | 10/2006 | Fullerton | G01S 13/72 342/147 |
| 2009/0153393 A1* | 6/2009 | Ikeda | G01S 13/931 342/70 |
| 2009/0284407 A1* | 11/2009 | Aoyagi | G01S 13/18 342/110 |
| 2010/0045507 A1* | 2/2010 | Yamano | G01S 3/74 342/70 |
| 2011/0140952 A1* | 6/2011 | Kemkemian | G01S 13/426 342/146 |
| 2012/0007606 A1* | 1/2012 | Rastegar | G05D 1/12 324/629 |
| 2012/0313812 A1* | 12/2012 | Rastegar | G01S 1/44 342/157 |
| 2014/0320333 A1* | 10/2014 | Sugiyama | G01S 13/02 342/81 |

FOREIGN PATENT DOCUMENTS

| | | | | |
|---|---|---|---|---|
| GB | 2425422 | | 10/2006 | |
| JP | H09-190593 A | | 7/1997 | |
| JP | 2010038731 A | * | 2/2010 | |
| JP | 2010-231604 A | | 10/2010 | |
| KR | 10-2005-0039638 A | | 4/2005 | |
| KR | 20140118736 A | * | 10/2014 | G01S 13/02 |

OTHER PUBLICATIONS

Korean Office Action mailed on Feb. 13, 2015 for corresponding Korean Patent Application No. 10-2014-21403, with English Translation, 6 pages.

Korean Office Action mailed on Aug. 28, 2015 for corresponding Korean Patent Application No. 10-2014-0021403, with English Translation, 5 pages.

\* cited by examiner

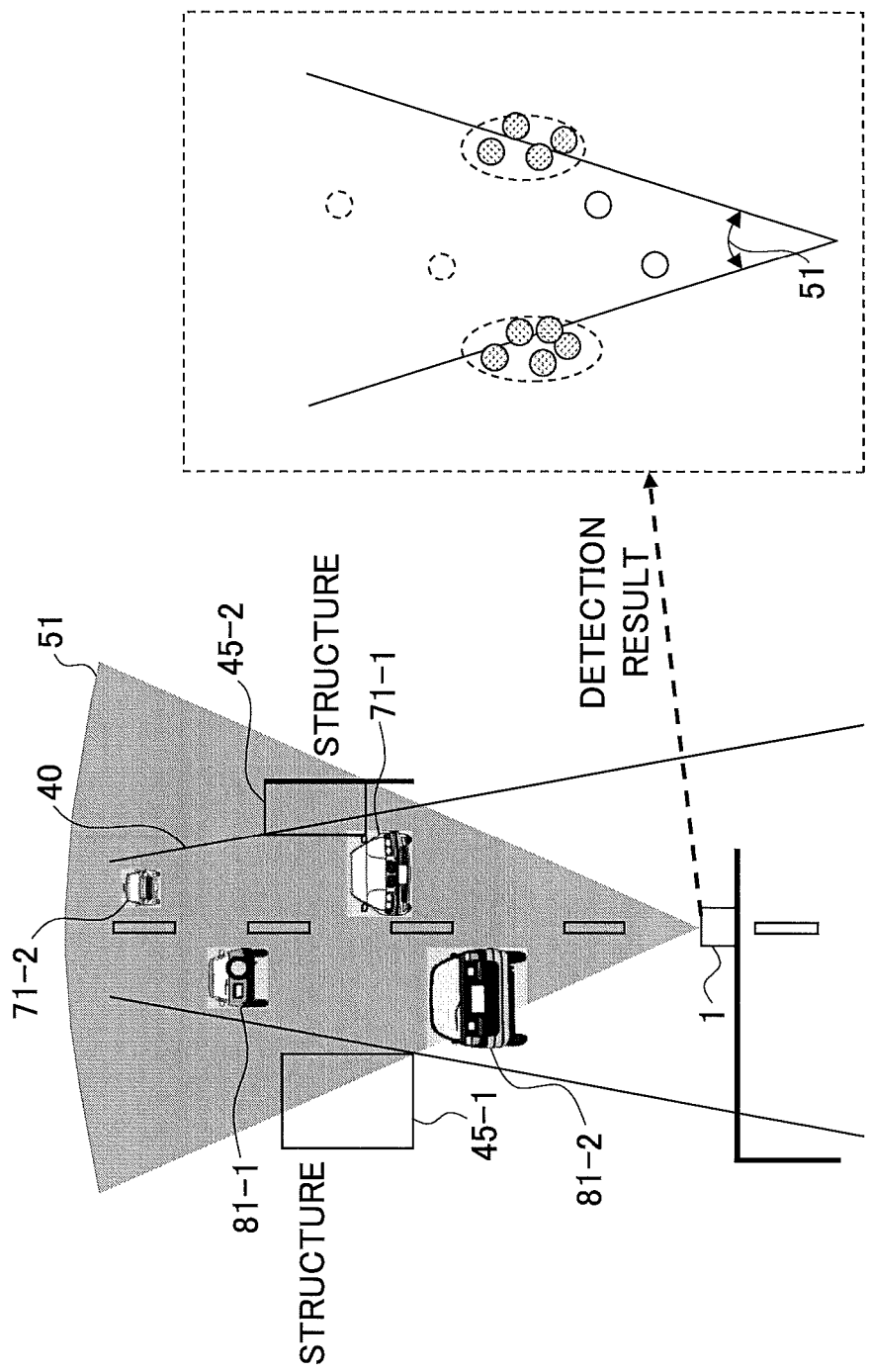

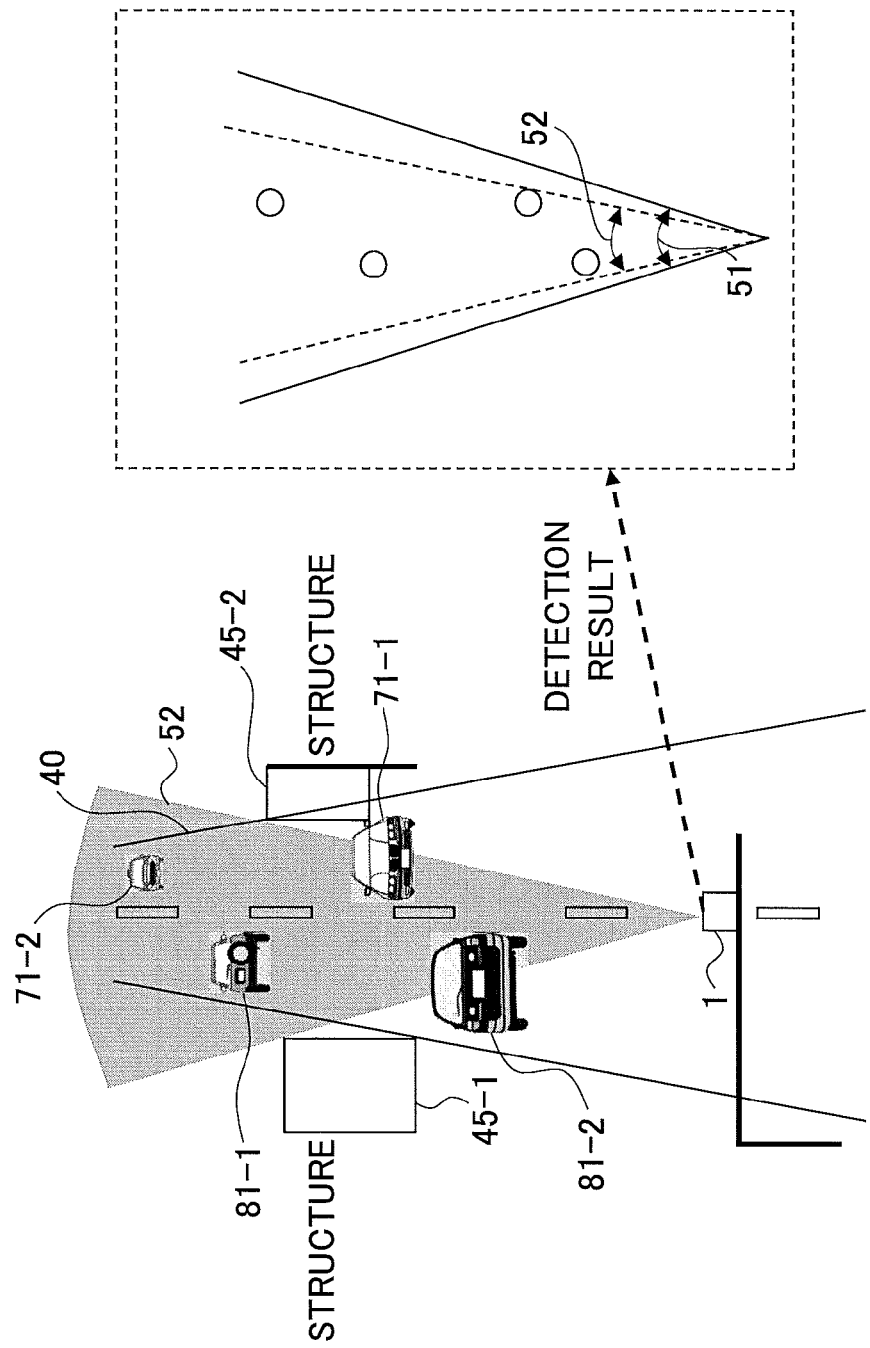

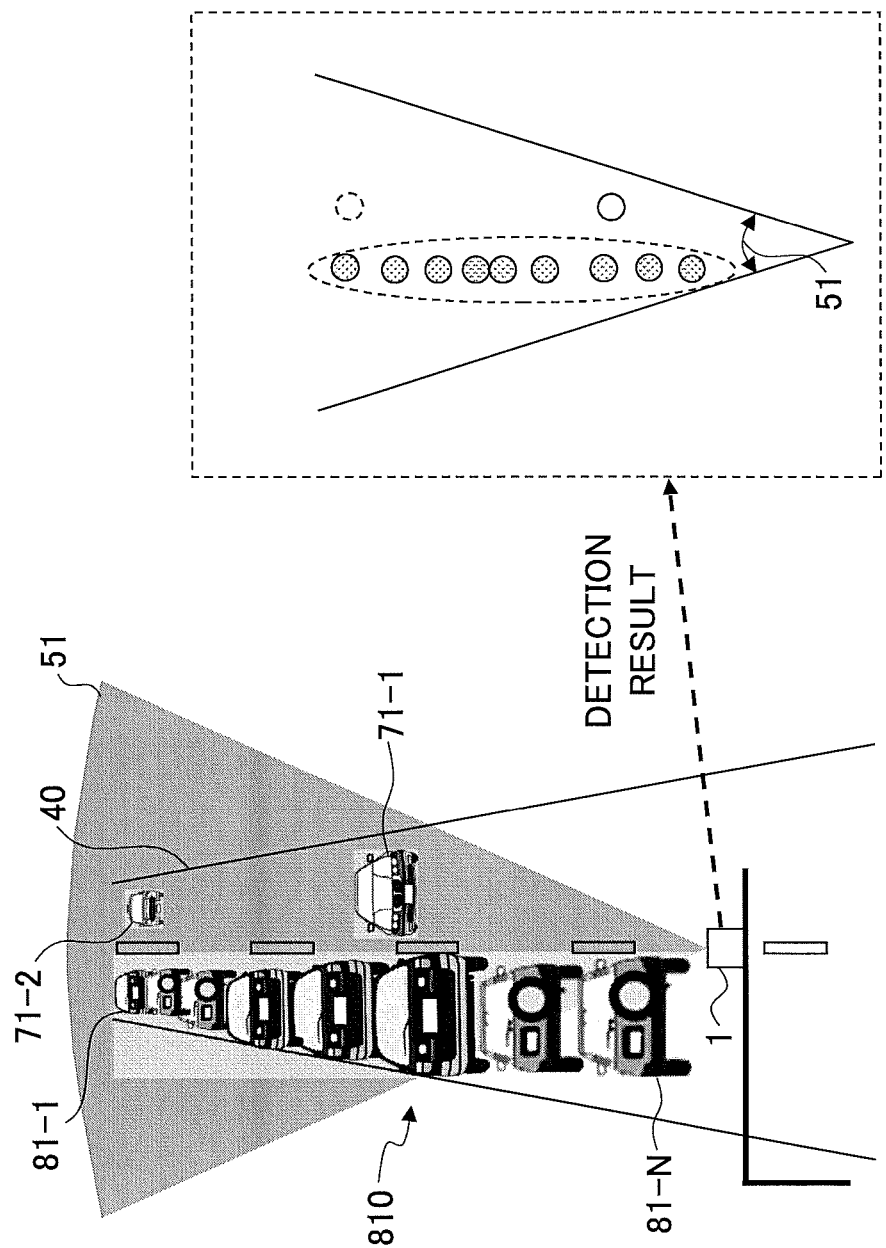

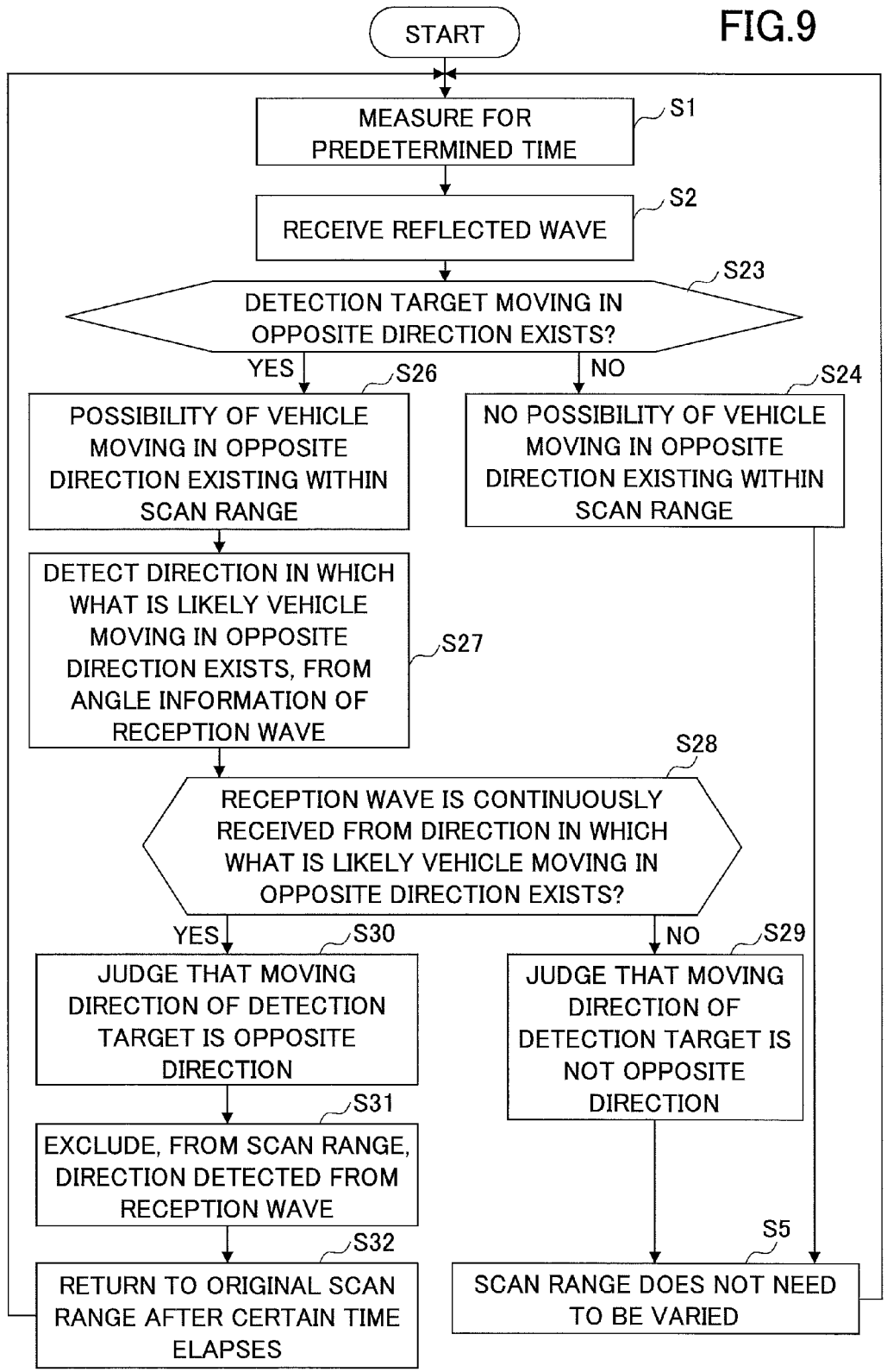

RADAR APPARATUS AND COMPUTER-READABLE STORAGE MEDIUM

CROSS-REFERENCE TO RELATED APPLICATIONS

This application is based upon and claims the benefit of priority of the prior Japanese Patent Application No. 2013-075033, filed on Mar. 29, 2013, the entire contents of which are incorporated herein by reference.

FIELD

The embodiments discussed herein are related to a radar apparatus and a computer-readable storage medium.

BACKGROUND

A scan type radar apparatus that detects an object or the like may be used in a monitoring system or the like. For example, a radio radar apparatus, such as an FM-CW (Frequency Modulated-Continuous Wave) radar apparatus or the like, periodically changes the transmission wave frequency and carries out the transmission without intermission. Because the transmission wave frequency is changed by the time the reflected wave from a detection target is received, the distance from the FM-CW radar apparatus to the detection target and a moving velocity of the detection target may be detected by measuring a difference between the transmission wave frequency and the reflected wave frequency in order to measure a time delay of the reflected wave. For this reason, when the FM-CW radar apparatus is used in a traffic monitoring system, for example, and the number of vehicles and the velocity of the vehicles traveling on each lane of the road monitored by the FM-CW radar apparatus are detected, it is possible to detect the degree of traffic congestion on each lane of the road. It is also possible to control a traffic light depending on the degree of traffic congestion, and to detect an obstructing object, such as trash, existing on the lane and warning drivers by displays or the like.

The FM-CW radar apparatus detects the detection target by pairing a difference between the transmission wave and the reflected wave within a frequency raising interval, and a difference between the transmission wave and the reflected wave within a frequency lowering interval. For example, a detection result of a number of pairs within a predetermined time may be output with a predetermined format. For this reason, when the number of pairs becomes extremely large as a result of the pairing, data of the detection target are desirably transferred at a relatively high transfer rate (or bit rate). However, the time and cost required to develop such a radar apparatus capable of transferring the data at the high transfer rate would increase, thereby making it difficult to create a relatively inexpensive radar apparatus.

On the other hand, in a case in which the transfer rate of the data of the detection target may be relatively low, only a limited number of detection targets (that is, the number of pairs) may be detected within a predetermined time. For this reason, when a relatively inexpensive radar apparatus having a relatively low data transfer rate, such as an on-board radar apparatus for vehicles, is used for the traffic monitoring system, the cost and time required to develop the radar apparatus may be prevented from increasing, however, only a limited number of detection targets becomes detectable.

Accordingly, a method has been proposed to assign a priority order, such as a detecting order, for example, with respect to the detection results, in order to output the detection results starting from the detection result having the highest priority order. However, even when the priority order is assigned with respect to the detection results, it is still only possible to detect a limited number of detection targets, regardless of the data transfer rate of the radar apparatus.

Accordingly, in the conventional radar apparatus, because only a limited number of detection targets may be detected, it is difficult to detect the detection targets with a high accuracy.

The applicant is aware of Japanese Laid-Open Patent Publication No. 2010-231604 and Japanese Laid-Open Patent Publication No. 9-190593.

SUMMARY

Accordingly, it is an object in one aspect of the embodiment to provide a radar apparatus and a computer-readable storage medium, which can detect the detection targets with a high accuracy.

According to one aspect of the present invention, a radar apparatus may include a detection unit configured to detect objects within a scan range based on a reflected wave received with respect to a transmission wave, and to output detection results of the objects; and an adjusting unit configured to narrow the scan range so as not to detect an object other than a target object, when the detection results include the object other than the target object detected in the scan range within a predetermined time, wherein the adjusting unit judges an object having a velocity less than a first value as the object other than the target object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams for explaining another example of the adjustment to narrow the scan range;

FIGS. 8A and 8B are diagrams for explaining an example of the adjustment to narrow the scan range;

FIG. 9 is a flow chart for explaining still another example of the operation of the CPU;

DESCRIPTION OF EMBODIMENTS

Preferred embodiments of the present invention will be described with reference to the accompanying drawings.

In one embodiment, when an object other than a detection target is detected in a scan range, the scan range is narrowed so as not to detect the object. Hence, even when only a limited number of detection results can be output within a predetermined time, for example, the probability of detecting the detection target within the narrowed scan range increases.

A description will now be given of the radar apparatus and the computer-readable storage medium in each embodiment according to the present invention.

Figure 1:
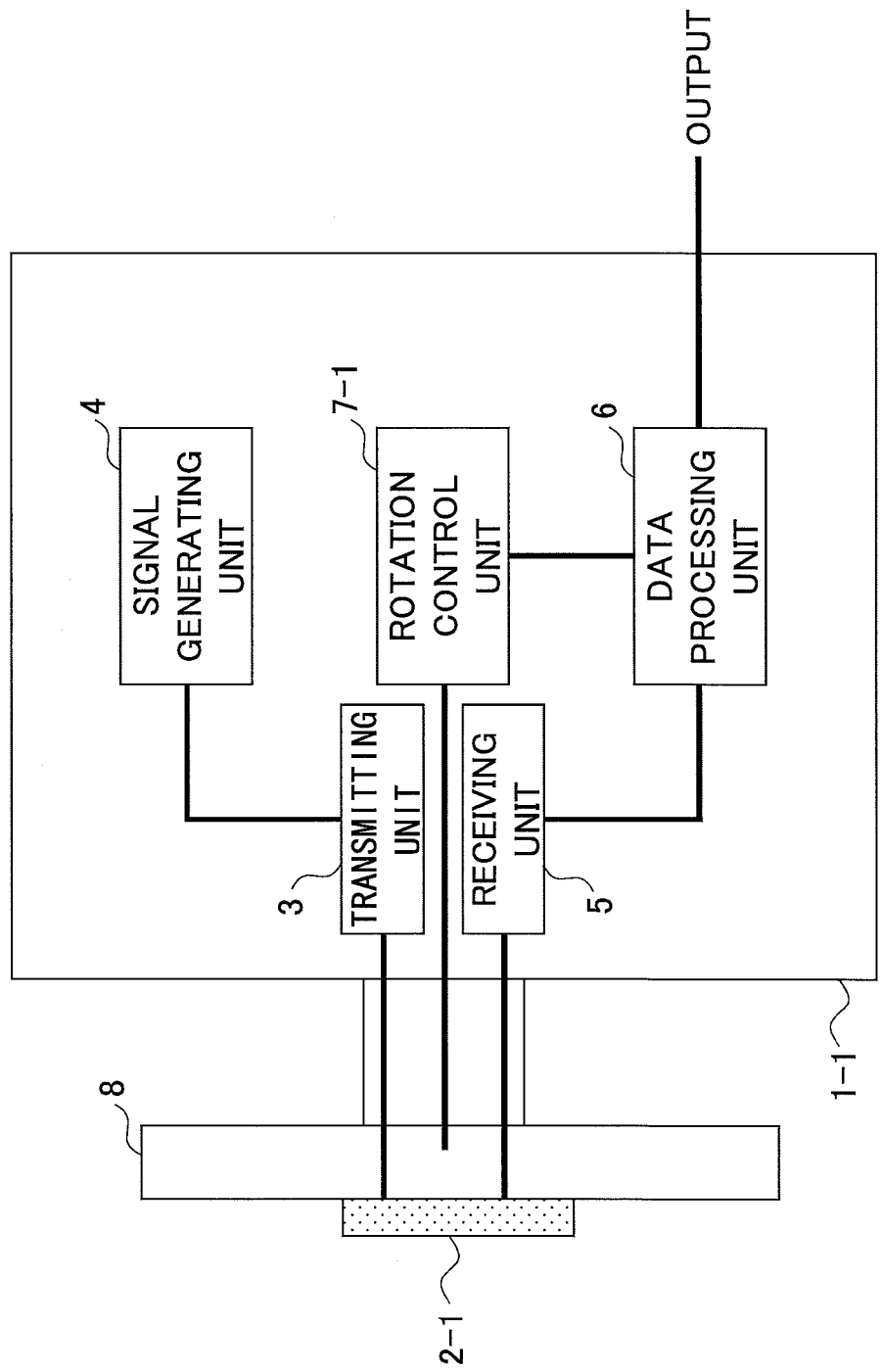
FIG. 1 is a diagram illustrating an example of a configuration of a radar apparatus in one embodiment.

FIG. 1 is a diagram illustrating an example of a configuration of the radar apparatus in one embodiment. A radar apparatus 1-1 illustrated in FIG. 1 may include an antenna unit 2-1, a transmitting unit 3, a signal generating unit 4, a receiving unit 5, a data processing unit 6, a rotation control unit 7-1, and a rotating unit 8. The radar apparatus 1-1 is an example of a radio radar apparatus, such as an FM-CW radar apparatus, for example.

A transmission signal from the signal generating unit 4 is converted into an analog signal by a DAC (Digital-to-Analog Converter) within the transmitting unit 3. The antenna unit 2-1 transmits a transmission wave of the analog signal with respect to a scan range (or scan region) that includes a detection target (not illustrated), and receives a reflected wave from the detection target or the like. The detection target is an example of an object. The reflected wave received by the antenna unit 2-1 is converted into a digital signal by an ADC (Analog-to-Digital Converter) within the receiving unit 5, and the digital signal is input to the data processing unit 6. The DAC may be externally connected to the transmitting unit 3, and the ADC may be externally connected to the receiving unit 5.

The data processing unit 6 has a detecting function to detect an object within the scan range based on the digital signal from the receiving unit 5, and to output a detection result of the object. The detection result of the object output from the data processing unit 6 may be output to an external apparatus (not illustrated), for example. In addition, the data processing unit 6 has an adjusting function to narrow the scan range so as not to detect the object, when the object other than the detection target is detected in the scan range within a predetermined time. This adjusting function may judge that the object is other than the detection target when a velocity of the object is lower than a first value and an acceleration of the object is lower than a second value. The adjusting function may narrow the scan range by a known method, by controlling the rotation control unit 7-1 in order to mechanically rotate the rotating unit 8 that is provided with the antenna unit 2-1. The adjusting function may control the rotation control unit 7-1 so that the narrowed scan range is returned to the original scan range before being narrowed after a certain time elapses from the time when the scan range is narrowed.

Figure 2:
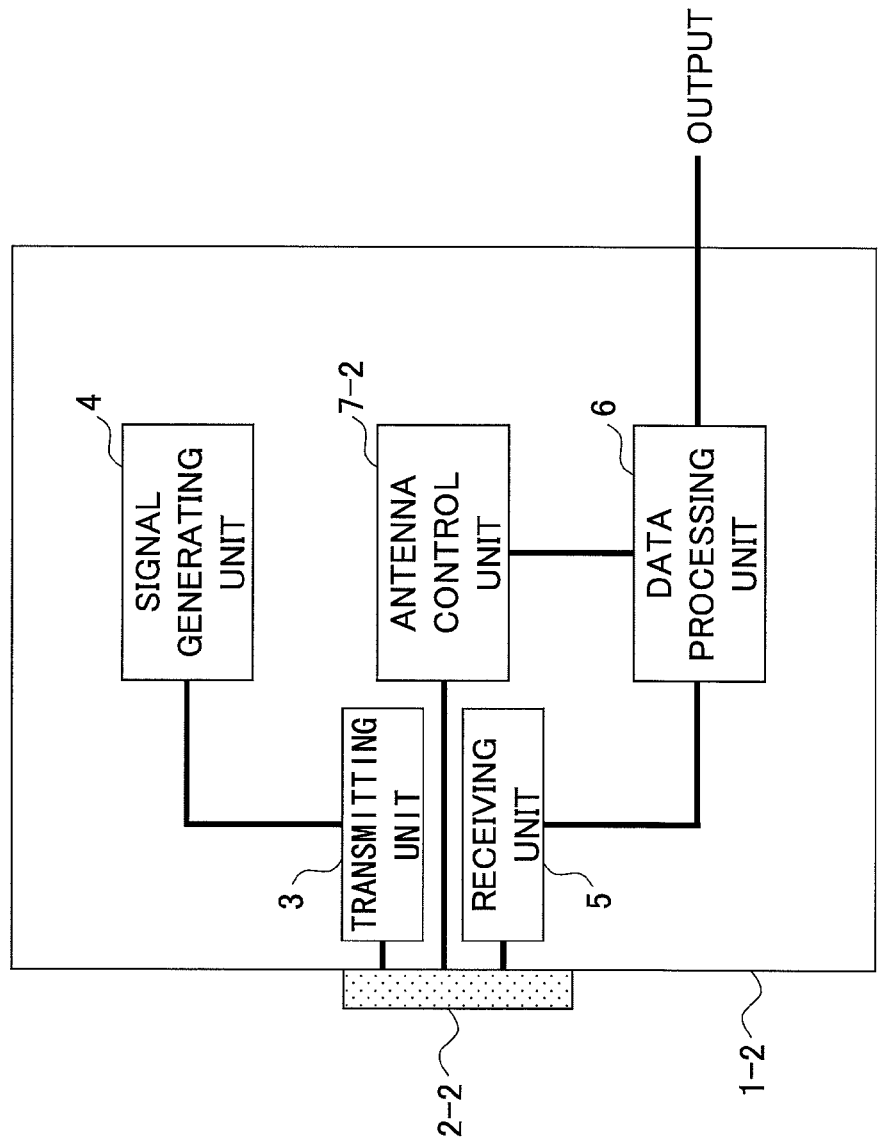
FIG. 2 is a diagram illustrating another example of the configuration of the radar apparatus in one embodiment.

FIG. 2 is a diagram illustrating another example of the configuration of the radar apparatus in one embodiment. In FIG. 2, those parts that are the same as those corresponding parts in FIG. 1 are designated by the same reference numerals, and a description thereof will be omitted. A radar apparatus 1-2 illustrated in FIG. 2 does not include the rotating unit 8. In addition, the radar apparatus 1-2 includes an antenna control unit 7-2 in place of the rotation control unit 7-1, and includes an electronic scan type antenna unit 2-2 that electronically varies the scan range in place of the antenna unit 2-1 that mechanically varies the scan range. The radar apparatus 1-2 is an example of the radio radar apparatus, such as the FM-CW radar apparatus, for example.

The adjusting function of the data processing unit 6 may narrow the scan range by a known method, by controlling the antenna control unit 7-2 in order to electronically narrow the scan range of the antenna unit 2-2. The adjusting function may control the antenna control unit 7-2 so that the narrowed scan range is returned to the original scan range before being narrowed after the certain time elapses from the time when the scan range is narrowed.

The antenna unit 2-1 or 2-2, the transmitting unit 3, the signal generating unit 4, the receiving unit 5, and the data processing unit 6 illustrated in FIGS. 1 and 2 may form an example of a detection unit (or detection means) that detects an object within the scan range based on the reflected wave with respect to the transmission wave and outputs a detection result of the object. The rotation control unit 7-1 and the rotating unit 8 illustrated in FIG. 1 may form an example of an adjusting unit (or adjusting means) that narrows the scan range so as not to detect the object other than the detection target, when the detection result of the detection unit includes the object other than the detection target detected in the scan range within the predetermined time. In addition, the antenna control unit 7-2 and the antenna unit 2-2 illustrated in FIG. 2 may form an example of an adjusting unit (or adjusting means) that narrows the scan range so as not to detect the object other than the detection target, when the detection result of the detection unit includes the object other than the detection target detected in the scan range within the predetermined time.

Figure 3:
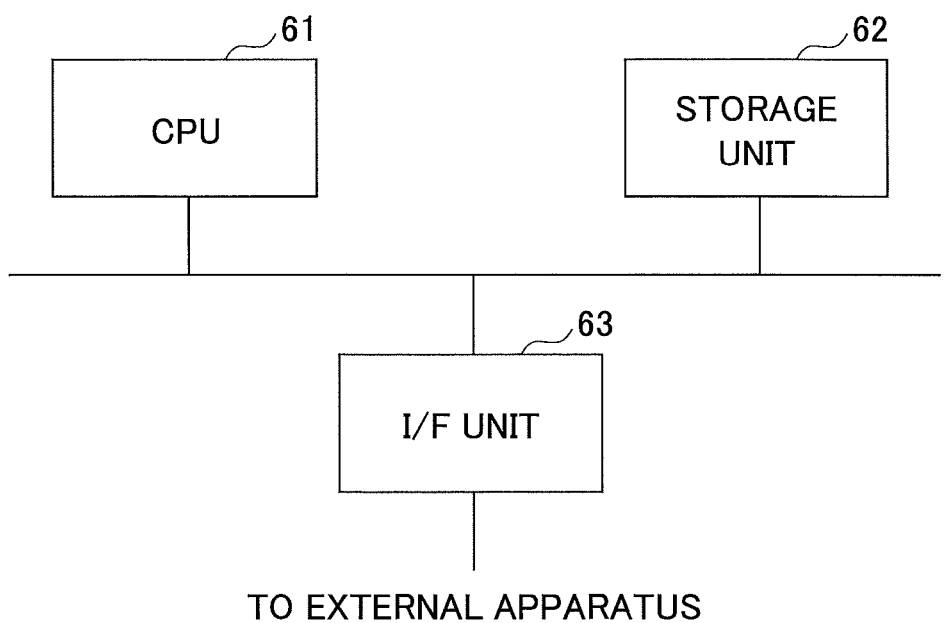
FIG. 3 is a block diagram illustrating an example of a computer.

FIG. 3 is a block diagram illustrating an example of a computer. A computer 60 illustrated in FIG. 3 may include a CPU (Central Processing Unit) 61 that is an example of a processor, a storage unit 62, and an interface (I/F) unit 63 that are connected via a bus 64. The interface unit 63 is an example of an interface means that provides an interface between the computer 60 and an external apparatus (not illustrated). The connection of the CPU 61, the storage unit 62, and the interface unit 63 is not limited to a bus connection that uses the bus 64.

The CPU 61 may execute a program to realize the functions of the data processing unit 6. The storage unit 62 is an example of a storage means that stores programs to be executed by the CPU 61, and various data. The various data may include data used by the programs and computations executed by the CPU 61, intermediate data of the computations, the data of the detection targets, and the like. The program may cause the CPU 61 to execute the process of at least the data processing unit 6. However, the program may cause the CPU 61 to execute the process of the signal generating unit 4, and/or the process of the rotation control unit 7-1 or the antenna control unit 7-2, in addition to the process of the data processing unit 6. In other words, the program may cause the CPU 61 to execute the processes of the data processing unit 6, the signal generating unit 4, and the rotation control unit 7-1 or the antenna control unit 7-2.

The storage unit 62 may be formed by a non-transitory computer-readable storage medium. The computer-readable storage medium may be formed by a semiconductor storage device (or memory). In addition, in a case in which the computer-readable storage medium is formed by a magnetic recording medium, an optical recording medium, a magnetooptical recording medium, or the like, the storage unit 62 may be formed by a reader and writer unit that reads information from and writes information to the recording medium that is loaded into the reader and writer unit. The interface unit 63 may communicate with the external apparatus by cable or wireless communication.

Figure 4:
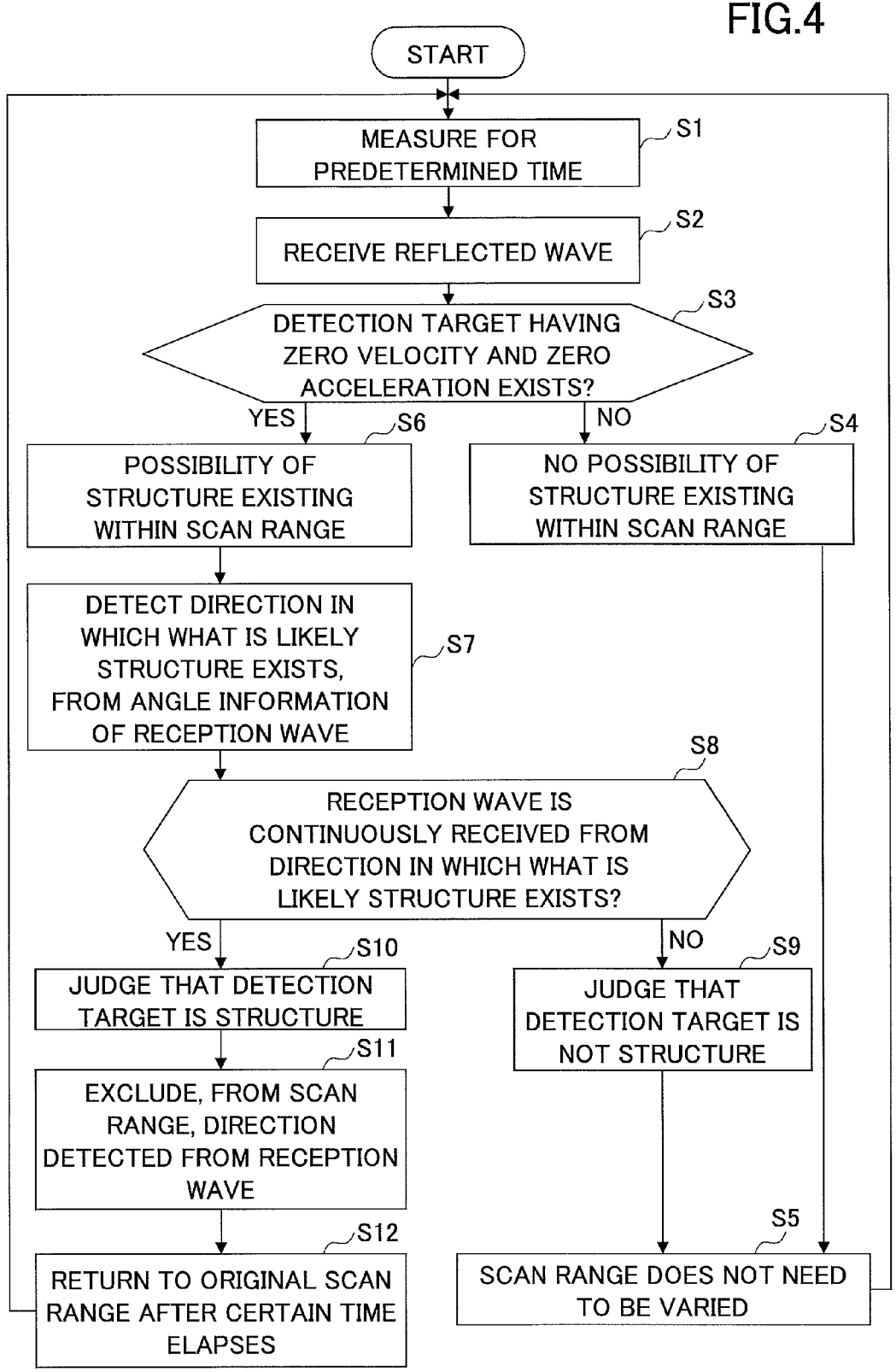
FIG. 4 is a flow chart for explaining an example of an operation of a CPU.

FIG. 4 is a flow chart for explaining an example of an operation of the CPU 61. In this example, the detection targets are vehicles. A description will be given of a process to exclude, from the detection targets, a structure (or object) that remains stationary or does not move for a relatively long time. The data computed by the process illustrated in FIG. 4 may be stored in the storage unit 62 illustrated in FIG. 3, for example. In the following description, it is assumed for the sake of convenience that a radar apparatus 1 is the radar apparatus 1-1 or the radar apparatus 1-2, and that an antenna unit 2 is the antenna unit 2-1 or the antenna unit 2-2.

In step S1 illustrated in FIG. 4, the CPU 61 starts the process to measure the detection target for a predetermined time. In step S2, the CPU 61 receives a reception wave (or reflected wave) with respect to the transmission wave transmitted from the antenna unit 2, via the antenna unit 2 and the receiving unit 5. In step S3, the CPU 61 detects the detection target by a known method, computes the velocity and the acceleration of the detection target, and judges whether a detection target having zero velocity and zero acceleration exists. In the case in which the radar apparatus 1 is the FM-CW radar apparatus, for example, the detection target may be detected by pairing a difference between the transmission wave and the reflected wave within a frequency raising interval, and a difference between the transmission wave and the reflected wave within a frequency lowering interval. Measured data of the detection target may include parameters, such as a distance from the radar apparatus 1 to the detection target, an angle from a center of the scan range of the radar apparatus 1, for example, to the position of the detection target, the velocity of the detection target, and an intensity of the reflected wave obtained from the detection target. Because a moving direction of the detection target may be detected based on whether the velocity of the detection target has a positive value or a negative value, the parameters may thus include the velocity and the acceleration of the detection target.

The process advances to step S4 when the judgment result in step S3 is NO. In step S4, the CPU 61 judges that there is no possibility of a structure (or object) existing within the scan range of the radar apparatus 1, and the process advances to step S5. In step S5, the CPU 61 judges that the scan range does not need to be varied, and the process returns to step S1.

On the other hand, the process advances to step S6 when the judgment result in step S3 is YES. In step S6, the CPU 61 judges that there is a possibility of a structure (or object) existing within the scan range of the radar apparatus 1. In step S7, the CPU 61 detects a direction in which what is likely a structure exists, from the angle information of the reception wave. In step S8, the CPU 61 judges whether the reception wave is continuously received from the direction in which what is likely a structure exists. The process advances to step S9 when the judgment result in step S8 is NO. In step S9, the CPU 61 judges that the detection target is not a structure, and the process advances to step S5 described above.

The process advances to step S10 when the judgment result in step S8 is YES. In step S10, the CPU 61 judges that the detection target is a structure, and the process advances to step S11. In step S11, the CPU 61 excludes, from the scan range, the direction detected from the reception wave. In other words, in step S11, when the structure that is an example of an object other than the detection target is detected in the scan range within a predetermined time, the CPU 61 performs an adjustment to narrow the scan range so as not to detect the structure. In step S12, after a certain time elapses, the CPU 61 returns the narrowed scan range to the original scan range before being narrowed, and the process returns to step S1.

Figure 5:
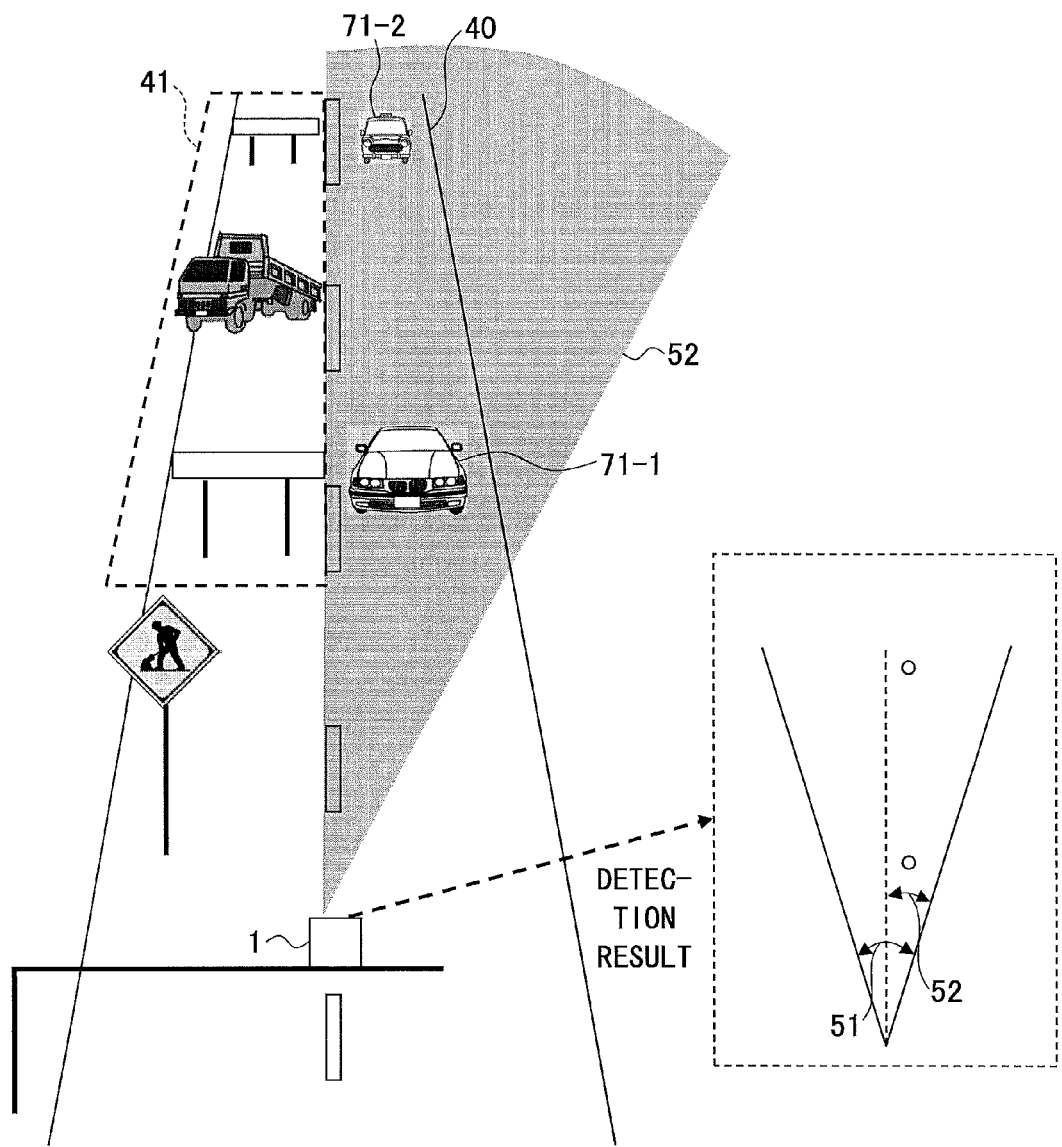
FIG. 5 is a diagram for explaining an example of an adjustment to narrow a scan range.

FIG. 5 is a diagram for explaining an example of the adjustment to narrow the scan range. In the example illustrated in FIG. 5, a left lane of a road 40 scanned by the radar apparatus 1 includes a construction section 41 that is under construction and is surrounded by a dotted line. The construction section 41 includes a parked truck, a road sign, or the like that are examples of the structure that does not move for a relatively long time (that is, during the construction period). On the other hand, vehicles 71-1 and 71-2 are traveling on a right lane of the road 40. As illustrated within a rectangular area indicated by dotted lines on the right side of FIG. 5, a scan range 51 of the radar apparatus 1 may be narrowed to a scan range 52 so as not to detect the construction section 41, in order to positively detect the vehicles 71-1 and 71-2 that are the detection targets illustrated by circular marks "◯", without exceeding the upper limit number of detection targets detectable within one (1) measuring period.

FIGS. 6A and 6B are diagrams for explaining another example of the adjustment to narrow the scan range. In FIGS. 6A and 6B, those parts that are the same as those corresponding parts in FIG. 5 are designated by the same reference numerals, and a description thereof will be omitted. In the example illustrated in FIGS. 6A and 6B, the vehicles 71-1 and 71-2 are traveling on the right lane of the road 40 scanned by the radar apparatus 1, and vehicles 81-1 and 81-2 are traveling on the left lane of this road 40. In addition, a building 45-1, which is an example of the structure that does not move, is provided on the left side of the road 40, and a road sign 45-2, which is another example of the structure that does not move, is provided on the right side of the road 40. FIG. 6A illustrates a comparison example in which the scan range 51 of the radar apparatus 1 is not narrowed, and FIG. 6B illustrates an embodiment in which the scan range 51 of the radar apparatus 1 is narrowed.

In the case of the comparison example illustrated in FIG. 6A, a plurality of points of the building 45-1 and the road sign 45-2 are detected as the detection targets, as illustrated by shaded circular marks within a rectangular area indicated by a dotted line on the right side. Hence, the vehicles 71-2 and 81-1 indicated by phantom circular marks in FIG. 6A, corresponding to the target objects exceeding the upper limit number of detection targets detectable within one (1) measuring period, are not detected as the detection targets. For this reason, in a case in which the vehicles 71-1, 71-2, 81-1, and 81-2 traveling on the right and left lanes of the road 40 are the detection targets, for example, only the vehicles 71-1 and 81-2 are detected, and the vehicles 71-2 and 81-1 are not detected. Consequently, it is not possible to positively detect all of the vehicles 71-1, 71-2, 81-1, and 81-2.

On the other hand, in the case of the embodiment illustrated in FIG. 6B, the scan range 51 of the radar apparatus 1 is narrowed to a scan range 52 so as not to detect the building 45-1 and the road sign 45-2. Hence, it is possible to positively detect all of the vehicles 71-1, 71-2, 81-1, and 81-2 that are the detection targets, without exceeding the upper limit number of detection targets detectable within one (1) measuring period, as illustrated by circular marks "○" within a rectangular area indicated by a dotted line on the right side.

Accordingly, in the example of the process illustrated in FIG. 4, the objects other than the detection targets in the scan range are detected based on the velocity and acceleration of the detection targets.

Figure 7:
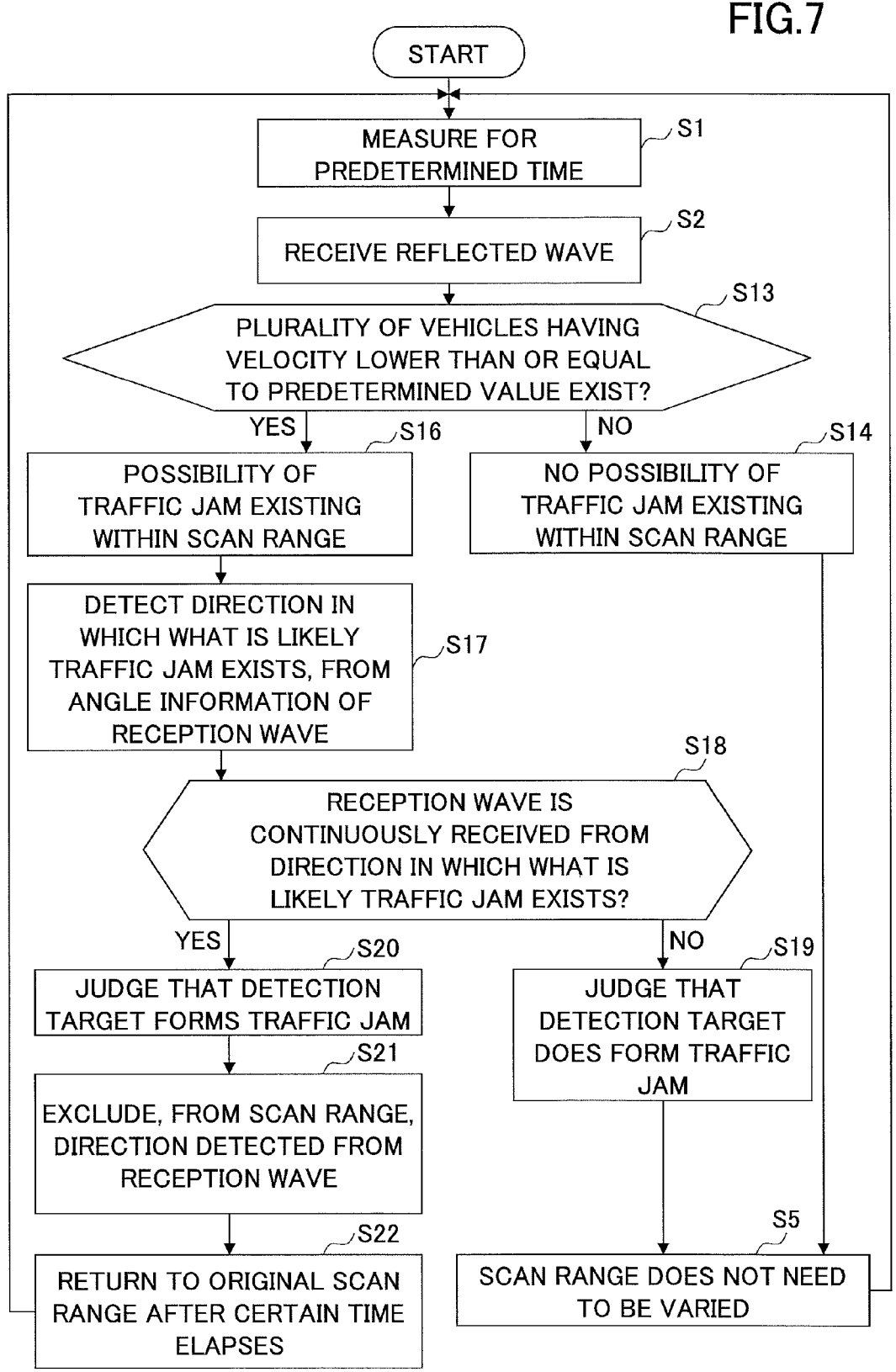
FIG. 7 is a flow chart for explaining another example of the operation of the CPU.

FIG. 7 is a flow chart for explaining another example of the operation of the CPU 61. In this example, the detection targets are vehicles. A description will be given of a process that excludes, from the detection targets, vehicles having slow moving velocities, by regarding the vehicles having the slow moving velocities as being included in (or belong to) a traffic jam. In FIG. 7, those steps that are the same as those corresponding steps in FIG. 4 are designated by the same reference numerals, and a description thereof will be omitted. The data computed by the process illustrated in FIG. 7 may be stored in the storage unit 62 illustrated in FIG. 3, for example.

In step S13 illustrated in FIG. 7, the CPU 61 detects the vehicles that are the detection targets, by a known method, computes the velocity and the acceleration of the detection targets, and judges whether a plurality of vehicles having a velocity lower than or equal to a predetermined value exist. In the case in which the radar apparatus 1 is the FM-CW radar apparatus, for example, the measured data of the detection targets include the velocities of the detection targets, and thus, the velocities of the detection targets may be computed in a manner similar to step S3 illustrated in FIG. 4.

When the judgment result in step S13 is NO, the process advances to step S14. In step S14, the CPU 61 judges that there is no possibility of a traffic jam formed by a sequence of a predetermined number or more vehicles having the velocity lower than or equal to the predetermined value existing within the scan range of the radar apparatus 1, and the process advances to step S5. On the other hand, the process advances to step S16 when the judgment result in step S13 is YES. In step S16, the CPU 61 judges that there is a possibility of a traffic jam existing within the scan range of the radar apparatus 1. In step S17, the CPU 61 detects a direction in which what is likely a traffic jam exists, from the angle information of the reception wave. In step S18, the CPU 61 judges whether the reception wave is continuously received from the direction in which what is likely a traffic jam exists. The process advances to step S19 when the judgment result in step S18 is NO. In step S19, the CPU 61 judges that the detection target does not form a traffic jam, and the process advances to step S5 described above.

The process advances to step S20 when the judgment result in step S18 is YES. In step S20, the CPU 61 judges that the detection target forms a traffic jam, and the process advances to step S21. In step S21, the CPU 61 excludes, from the scan range, the direction detected from the reception wave. In other words, in step S21, when the traffic jam that is an example of an object other than the detection target is detected in the scan range within a predetermined time, the CPU 61 performs an adjustment to narrow the scan range so as not to detect the traffic jam. In step S22, after a certain time elapses, the CPU 61 returns the narrowed scan range to the original scan range before being narrowed, and the process returns to step S1.

Figure 8B:
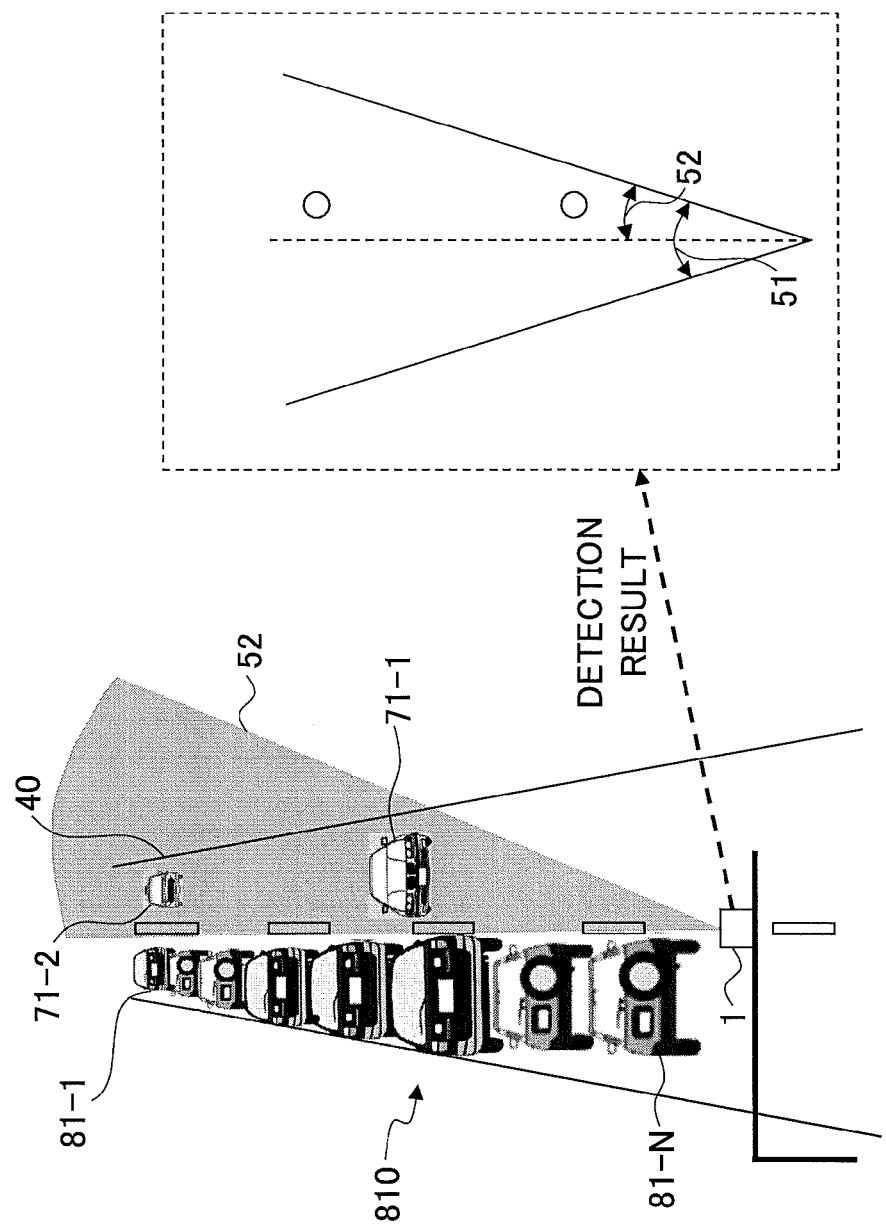

FIGS. 8A and 8B are diagrams for explaining an example of the adjustment to narrow the scan range. In FIGS. 8A and 8B, those parts that are the same as those corresponding parts in FIGS. 6A and 6B are designated by the same reference numerals, and a description thereof will be omitted. In the example illustrated in FIGS. 8A and 8B, a traffic jam 810 formed by vehicles 81-1 through 81-N (N is a natural number greater than or equal to 2) is generated in the left lane of the road 40 scanned by the radar apparatus 1. On the other hand, the vehicles 71-1 and 71-2 are traveling on the right lane of the road 40, and no traffic jam is generated on the right lane of the road 40. FIG. 8A illustrates a comparison example in which the scan range 51 of the radar apparatus 1 is not narrowed, and FIG. 8B illustrates an embodiment in which the scan range 51 of the radar apparatus 1 is narrowed.

In the case of the comparison example illustrated in FIG. 8A, at least a part of the vehicles 81-1 through 81-N forming the traffic jam 810 are detected as the detection targets, as illustrated by shaded circular marks within a rectangular area indicated by a dotted line on the right side. Hence, the vehicle 71-2 indicated by phantom circular mark in FIG. 8A, corresponding to the target object exceeding the upper limit number of detection targets detectable within one (1) measuring period, is not detected as the detection target. For this reason, in a case in which the vehicles 71-1, 71-2, and 81-1 through 81-N traveling on the right and left lanes of the road 40 are the detection targets, for example, only the vehicle 71-1 and a part of the vehicles 81-1 through 81-N forming the traffic jam 810 are detected, and the vehicle 71-2 is are not detected. Consequently, it is not possible to positively detect the vehicles 71-1 and 71-2 that are the detection targets.

On the other hand, in the case of the embodiment illustrated in FIG. 8B, the scan range 51 of the radar apparatus 1 is narrowed to the scan range 52 so as not to detect the vehicles 81-1 through 81-N forming the traffic jam 810. Hence, it is possible to positively detect the vehicles 71-1 and 71-2 that are the detection targets, without exceeding the upper limit number of detection targets detectable within one (1) measuring period, as illustrated by circular marks "○" within a rectangular area indicated by a dotted line on the right side.

Accordingly, in the example of the process illustrated in FIG. 7, the objects other than the detection targets in the scan range are detected based on the velocity of the detection targets.

FIG. 9 is a flow chart for explaining still another example of the operation of the CPU 61. In this example, the detection targets are vehicles. A description will be given of a process that excludes, from the detection targets moving in a certain moving direction, vehicles moving in an opposite moving direction. In FIG. 9, those steps that are the same as those corresponding steps in FIG. 4 are designated by the same reference numerals, and a description thereof will be omitted. The data computed by the process illustrated in FIG. 9 may be stored in the storage unit 62 illustrated in FIG. 3, for example.

In step S23 illustrated in FIG. 9, the CPU 61 detects the vehicles that are the detection targets, by a known method, computes the moving directions of the detection targets, and judges whether a vehicle moving in a direction opposite to the moving direction towards the radar apparatus 1, that is, moving in the direction away from the radar apparatus 1, exists. In the case in which the radar apparatus 1 is the FM-CW radar apparatus, for example, the measured data of the detection targets include the velocities of the detection targets, and thus, the velocities of the detection targets may be computed in a manner similar to step S3 illustrated in FIG. 4. The moving directions of the vehicles may be computed based on whether the velocity has a positive value or a negative value.

When the judgment result in step S23 is NO, the process advances to step S24. In step S24, the CPU 61 judges that there is no possibility of a vehicle traveling in the opposite moving direction existing within the scan range of the radar apparatus 1, and the process advances to step S5. On the other hand, the process advances to step S26 when the judgment result in step S23 is YES. In step S26, the CPU 61 judges that there is a possibility of a vehicle traveling in the opposite moving direction existing within the scan range of the radar apparatus 1. In step S27, the CPU 61 detects a direction in which what is likely a vehicle traveling in the opposite moving direction exists, from the angle information of the reception wave. In step S28, the CPU 61 judges whether the reception wave is continuously received from the direction in which what is likely a vehicle traveling in the opposite moving direction exists. The process advances to step S29 when the judgment result in step S28 is NO. In step S29, the CPU 61 judges that the moving direction of the detection target is not the opposite moving direction, and the process advances to step S5 described above.

The process advances to step S30 when the judgment result in step S28 is YES. In step S30, the CPU 61 judges that the moving direction of the detection target is the opposite moving direction, and the process advances to step S31. In step S31, the CPU 61 excludes, from the scan range, the direction detected from the reception wave. In other words, in step S31, when the vehicle traveling in the opposite moving direction, that is an example of an object other than the detection target, is detected in the scan range within a predetermined time, the CPU 61 performs an adjustment to narrow the scan range so as not to detect the vehicle traveling in the opposite moving direction. In step S32, after a certain time elapses, the CPU 61 returns the narrowed scan range to the original scan range before being narrowed, and the process returns to step S1. In step S32, the CPU 61 may determine a timing at which the narrowed scan range is returned to the original scan range not only based on a first condition, which is the lapse of the certain time, but also based on a second condition, such as a time band, track switching information, or the like.

Figure 10:
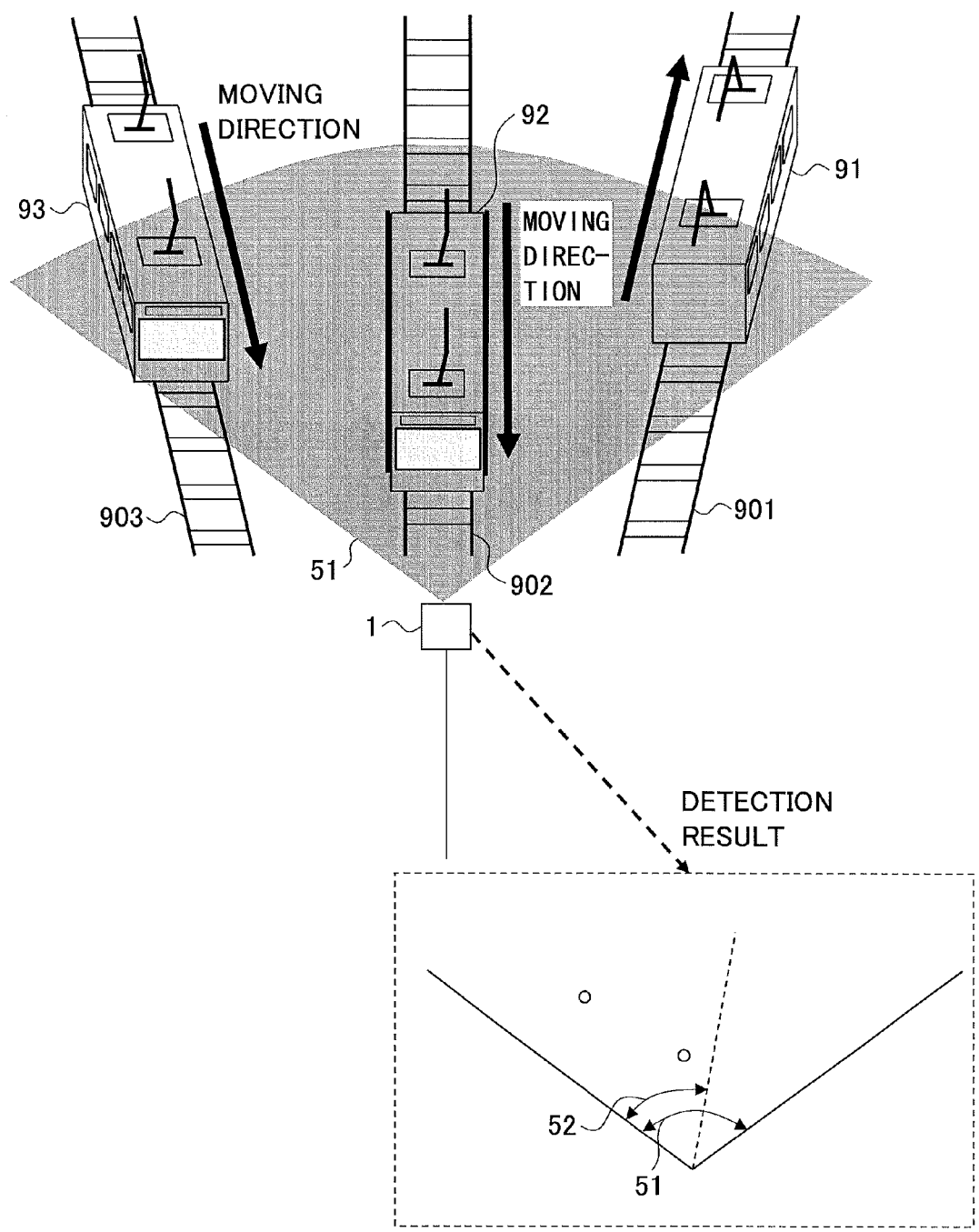
FIG. 10 is a diagram for explaining an example of the adjustment to narrow the scan range.

FIG. 10 is a diagram for explaining an example of the adjustment to narrow the scan range. In the example illustrated in FIG. 10, the radar apparatus 1 scans tracks 901 through 903 on which vehicles 91 through 93 travel. For example, the vehicle 91 travels in a direction (upward direction in FIG. 10) away from the radar apparatus 1, and the vehicles 92 and 93 travel in a direction (downward direction in FIG. 10) towards the radar apparatus 1. The scan range 51 of the radar apparatus 1 may be narrowed to the scan range 52 so as not to detect the vehicle 91 traveling in the opposite moving direction away from the radar apparatus 1, in order to positively detect the vehicles 92 and 93 that are the detection targets traveling in the moving direction towards the radar apparatus 1, without exceeding the upper limit number of detection targets detectable within one (1) measuring period, as illustrated by circular marks "○" within a rectangular area indicated by a dotted line on the bottom right side of FIG. 10.

Accordingly, in the example of the process illustrated in FIG. 9, the objects other than the detection targets in the scan range are detected based on the moving direction of the detection targets.

Figure 11:
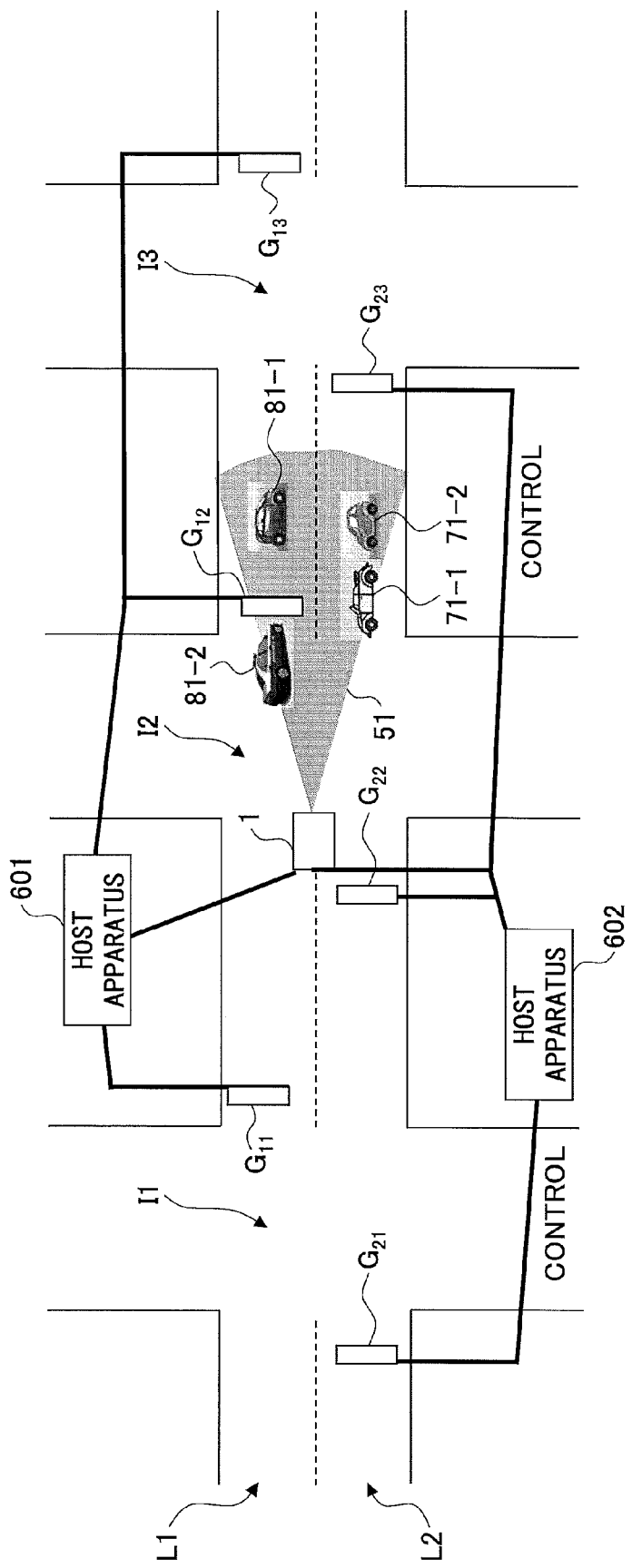
FIG. 11 is a diagram for explaining a traffic light control of a traffic monitoring system in a state in which no traffic jam exists.
Figure 12:
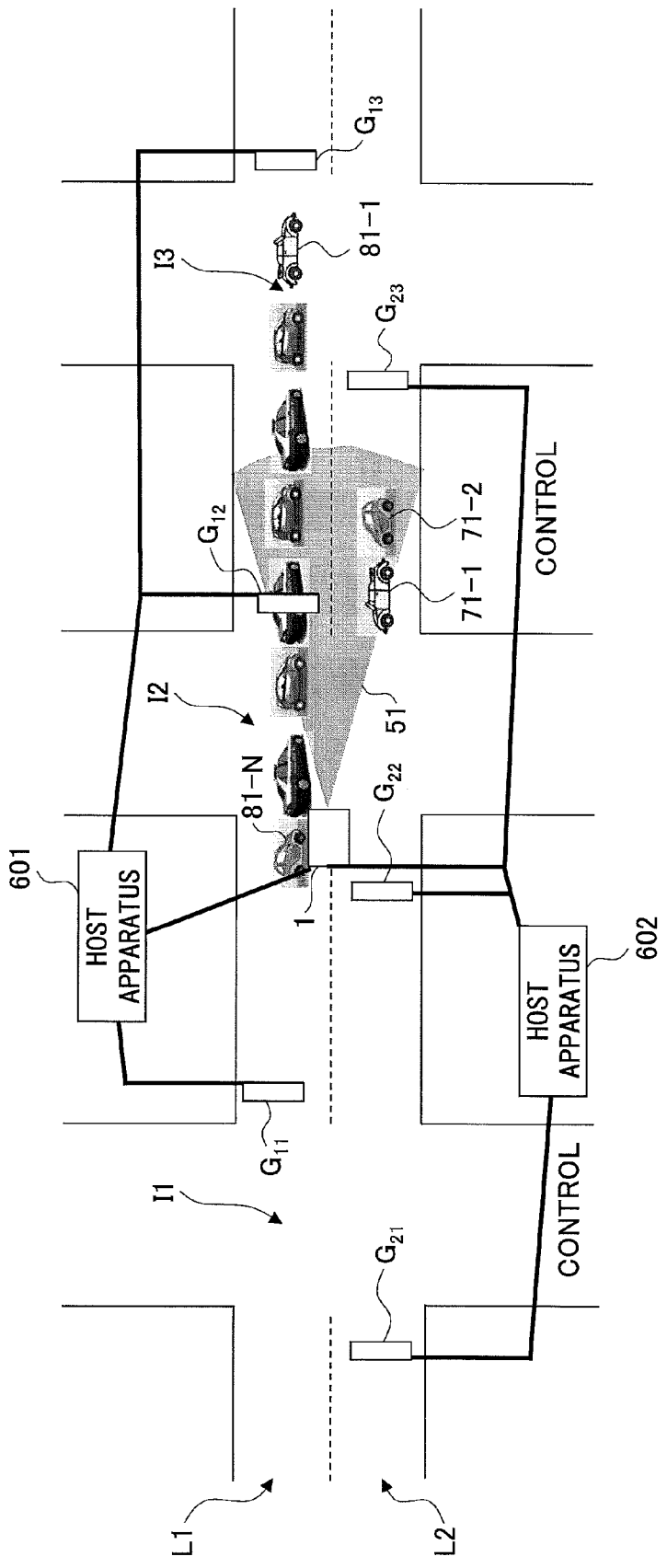
FIG. 12 is a diagram for explaining the traffic light control of the traffic monitoring system in a state in which the traffic jam is generated.

Next, a description will be given of a traffic monitoring system using the radar apparatus of the above described embodiment, by referring to FIGS. 11 and 12. FIG. 11 is a diagram for explaining a traffic light control of the traffic monitoring system in a state in which no traffic jam exists. FIG. 12 is a diagram for explaining the traffic light control of the traffic monitoring system in a state in which the traffic jam is generated. Host apparatuses 601 and 602 are examples of the external apparatus with respect to the radar apparatus 1.

In FIGS. 11 and 12, the radar apparatus 1 is provided in a vicinity of an intersection I2, and scans lanes L1 and L2 in a scan range towards an intersection I3. With respect to the lane L1, a traffic light $G_{11}$ is provided at an intersection I1, a traffic light $G_{12}$ is provided at the intersection I2, and a traffic light $G_{13}$ is provided at the intersection I3. On the other hand, with respect to the lane L2, a traffic light $G_{21}$ is provided at the intersection I1, a traffic light $G_{22}$ is provided at the intersection I2, and a traffic light $G_{23}$ is provided at the intersection I3. The host apparatus 601 is connected to the radar apparatus 1 and the traffic lights $G_{11}$, $G_{12}$, and $G_{13}$ that are provided with respect to the lane L1. The host apparatus 602 is connected to the radar apparatus 1 and the traffic lights $G_{21}$, $G_{22}$, and $G_{23}$ that are provided with respect to the lane L2. The host apparatuses 601 and 602 may be formed by a computer, respectively, and may be connected to each other. Functions of the host apparatuses 601 and 602 may of course be realized by a single computer.

In the state illustrated in FIG. 11 in which no traffic jam exists, on the lane L1, the vehicle 81-1 is approaching the intersection I3, and the vehicle 81-2 is passing the intersection I2. On the other hand, on the lane L2, the vehicles 71-1 and 71-2 are approaching the intersection I2. In this example, the radar apparatus 1 judges that no traffic jam exists on the lanes L1 and L2, and the scan range is not narrowed. When the host apparatus 601 judges from the detection results of the radar apparatus 1 that the vehicles 81-1 and 81-2 exist on the lane L1, the host apparatus 601 controls the traffic light $G_{13}$ at the intersection I3 to turn the green lamp ON for a predetermined time until the vehicles 81-1 and 81-2 pass the intersection I3. In addition, when the host apparatus 601 judges from the detection results of the radar apparatus 1 that no vehicle exists on the lane L1, the host apparatus 601 controls the traffic light $G_{13}$ at the intersection I3 to immediately switch the lamp that is turned ON from the green lamp to the yellow lamp, and then to the red lamp. On the other hand, when the host apparatus 602 judges from the detection results of the radar apparatus 1 that the vehicles 71-1 and 71-2 exist on the lane L2, the host apparatus 602 controls the traffic light $G_{21}$ at the intersection I1 to turn the green lamp ON for a predetermined time until the vehicles 71-1 and 71-2 pass the intersection I1. In addition, when the host apparatus 602 judges from the detection results of the radar apparatus 1 that no vehicle exists on the lane L2, the host apparatus 602 controls the traffic light $G_{21}$ at the intersection I1 to immediately switch the lamp that is turned ON from the green lamp to the yellow lamp, and then to the red lamp. The host apparatuses 601 and 602 may control the traffic lights $G_{12}$ and $G_{22}$ at the intersection I2, based on the control timings of the traffic light $G_{21}$ at the intersection I1 and the traffic light $G_{13}$ at the intersection I3.

In the state illustrated in FIG. 12 in which the traffic jam is generated, on the lane L1, the vehicle 81-1 is approaching the intersection I3, and the vehicle 81-N at the tail of the vehicle sequence is approaching the intersection I2. On the other hand, on the lane L2, the vehicles 71-1 and 71-2 are approaching the intersection I2. In this example, the radar apparatus 1 judges from the detection results of the lane L1 that the traffic jam exists on the lane L1, and the scan range is narrowed so as to scan only the lane L2. When the host apparatus 601 judges from the detection results of the radar apparatus 1 that the traffic jam is generated on the lane L1, the host apparatus 601 controls the switching period of the traffic light $G_{13}$ at the intersection I3 for switching the lamp that is turned ON from the red lamp to the green lamp (or from the green lamp to the yellow lamp, and then to the red lamp) to become constant, so that the switching period is not controlled depending on the detection results of the radar apparatus 1, for example. On the other hand, when the host apparatus 602 detects from the detection results of the radar apparatus 1 that the vehicles 71-1 and 71-2 exist on the lane L2, the host apparatus 602 controls the traffic light $G_{21}$ at the intersection I1 to turn the green lamp ON for a predetermined time until the vehicles 71-1 and 71-2 pass the intersection I11. In addition, when the host apparatus 602 judges from the detection results of the radar apparatus 1 that no vehicle exists on the lane L2, the host apparatus 602 controls the traffic light $G_{21}$ at the intersection I1 to immediately switch the lamp that is turned ON from the green lamp to the yellow lamp, and then to the red lamp. The host apparatuses 601 and 602 may control the traffic lights $G_{12}$ and $G_{22}$ at the intersection I2, based on the control timings of the traffic light $G_{21}$ at the intersection I1 and the traffic light $G_{13}$ at the intersection I3.

In a case in which the traffic light is provided on the lane scanned by the radar apparatus, it may be difficult for the radar apparatus to judge whether a plurality of vehicles having a velocity close to zero (0) on the lane is stopping at the red light, or are stopping due to a traffic jam. In such a case, the radar apparatus may judge that a traffic jam is generated when the vehicles having the velocity close to zero on the lane is greater than or equal to a predetermined number, and judge that the vehicles are stopping to the red traffic light when the vehicles having the velocity close to zero on the lane is less than the predetermined number. In addition, in a case in which the radar apparatus is connected to the host apparatus that controls the traffic light, the host apparatus may analyze the detection results (number of vehicles, velocity and acceleration of vehicles, or the like) from the radar apparatus based on the switching timing of the traffic light, in order to distinguish between the traffic jam and the vehicles stopping to the red traffic light.

According to the embodiment described above, when the radar apparatus detects the object other than the detection target in the scan range, the radar apparatus narrows the scan range so as not to detect the object. As a result, even when the radar apparatus can only output a predetermined number of detection results within a predetermined time, the probability of detecting the detection target within the narrowed scan range increases, and the detection target can be detected with a high accuracy. In addition, the scan range may be narrowed dynamically depending on an environmental change within the scan range, so as not to detect the object other than the detection target. In a case in which the environmental change within the scan range is a temporary change, such as a road construction, traffic jam, or the like, the narrowed scan range may be returned to the original scan range before being narrowed so that the radar apparatus may scan the original, intended scan range, after the road construction is completed, the traffic jam disappears, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radar apparatus comprising:
   a storage configured to store a program; and
   a processor configured to execute the program and perform a process including
      detecting objects within a scan range based on a reflected wave received with respect to a transmission wave, to output detection results of the objects; and
      narrowing the scan range so as not to detect an object other than a target object, when the detection results include the object other than the target object detected in the scan range within a predetermined time,
   wherein the narrowing includes judging an object having a velocity less than a first value as the object other than the target object.

2. The radar apparatus as claimed in claim 1, wherein the processor performs the process further including
   returning a narrowed scan range that is narrowed by the narrowing, back to the scan range before being narrowed by the narrowing, after a certain time elapses from the narrowing.

3. The radar apparatus as claimed in claim 1, wherein the judging judges an object having an acceleration less than a second value as the object other than the target object.

4. The radar apparatus as claimed in claim 3, wherein the first value and the second value are zero.

5. The radar apparatus as claimed in claim 1, wherein the narrowing electronically narrows the scan range.

6. The radar apparatus as claimed in claim 1, wherein the narrowing mechanically narrows the scan range.

7. The radar apparatus as claimed in claim 1, wherein the predetermined time amounts to one measuring period for detecting the objects.

8. A non-transitory computer-readable storage medium having stored therein a program which, when executed by a computer of a radar apparatus, causes the computer to perform a process comprising:
   detecting objects within a scan range based on a reflected wave received by an antenna unit of the radar apparatus with respect to a transmission wave transmitted from the radar unit, and outputting detection results of the objects; and
   narrowing the scan range so as not to detect an object other than a target object, when the detection results include the object other than the target object detected in the scan range within a predetermined time,
   wherein the narrowing includes judging an object having a velocity less than a first value as the object other than the target object.

9. The non-transitory computer-readable storage medium as claimed in claim 8, wherein the program which, when executed by the computer of the radar apparatus, causes the computer to perform the process further comprising:
   returning a narrowed scan range that is narrowed by the narrowing, back to the scan range before being narrowed by the narrowing, after a certain time elapses from the narrowing.

10. The non-transitory computer-readable storage medium as claimed in claim 8, wherein the judging judges an object having an acceleration less than a second value as the object other than the target object.

11. The non-transitory computer-readable storage medium as claimed in claim 10, wherein the first value and the second value are zero.

12. The non-transitory computer-readable storage medium as claimed in claim 8, wherein the narrowing electronically narrows the scan range.

13. The non-transitory computer-readable storage medium as claimed in claim 8, wherein the narrowing mechanically narrows the scan range.

14. The non-transitory computer-readable storage medium as claimed in claim 8, wherein the predetermined time amounts to one measuring period for detecting the objects.

15. The non-transitory computer-readable storage medium as claimed in claim 8, wherein
the target object is a vehicle, and
the object other than the target object is a structure that does not move, or a traffic jam that is formed by a vehicle sequence including a plurality of vehicles, greater than or equal to a predetermined number, and respectively having a velocity less than or equal to a predetermined velocity.

16. A radar apparatus comprising:
a transmitter configured to transmit a transmission wave;
a receiver configured to receive a reflected wave with respect to the transmission wave;
a storage configured to store a program; and
a processor configured to execute the program and perform a process including
detecting objects within a scan range of the transmission wave transmitted from the transmitter based on the reflected wave received by the receiver with respect to the transmission wave, to output detection results of the objects; and
narrowing the scan range so as not to detect an object other than a target object, when the detection results include the object other than the target object detected in the scan range within a predetermined time,
wherein the narrowing includes judging an object having a velocity less than a first value as the object other than the target object.

17. The radar apparatus as claimed in claim 16, wherein the judging judges an object having an acceleration less than a second value as the object other than the target object.

18. The radar apparatus as claimed in claim 17, wherein the first value and the second value are zero.

19. The radar apparatus as claimed in claim 16, wherein the narrowing electronically narrows the scan range.

20. The radar apparatus as claimed in claim 16, wherein the narrowing mechanically narrows the scan range.

* * * * *